Aug. 8, 1939.     A. DE VRIES     2,168,966
BULB DIGGING MACHINE
Filed Oct. 22, 1937     4 Sheets-Sheet 3

Inventor:
ABRAHAM DE VRIES

BY *Ch. Snow & Co.*

ATTORNEYS.

Aug. 8, 1939.  A. DE VRIES  2,168,966

BULB DIGGING MACHINE

Filed Oct. 22, 1937  4 Sheets—Sheet 4

Inventor:
ABRAHAM DE VRIES

BY  C.A. Snow & Co.

ATTORNEYS.

Patented Aug. 8, 1939

2,168,966

UNITED STATES PATENT OFFICE 2,168,966

BULB DIGGING MACHINE

Abraham De Vries, St. Anne, Ill.

Application October 22, 1937, Serial No. 170,490

3 Claims. (Cl. 55—9)

This invention relates to an agricultural machine designed primarily for use in harvesting and cleaning bulbs, or vegetables of a similar character wherein the tops of the vegetables grow above the ground surface.

An important object of the invention is to provide a machine of this character which will plow the bulbs from the ground, means being provided for cutting the tops from the bulbs and conveying the bulbs to the rear of the machine where the bulbs are cleaned and prepared for the next season's planting.

Another object of the invention is to provide a machine having a plow adapted to dig or remove the bulbs from the ground surface, the plow being supported in such a way that it may be adjusted vertically or laterally to insure the proper positioning of the plow to remove the bulbs from a particular row.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 7 is a sectional view taken on line 7—7 of Figure 6.

Figure 1:
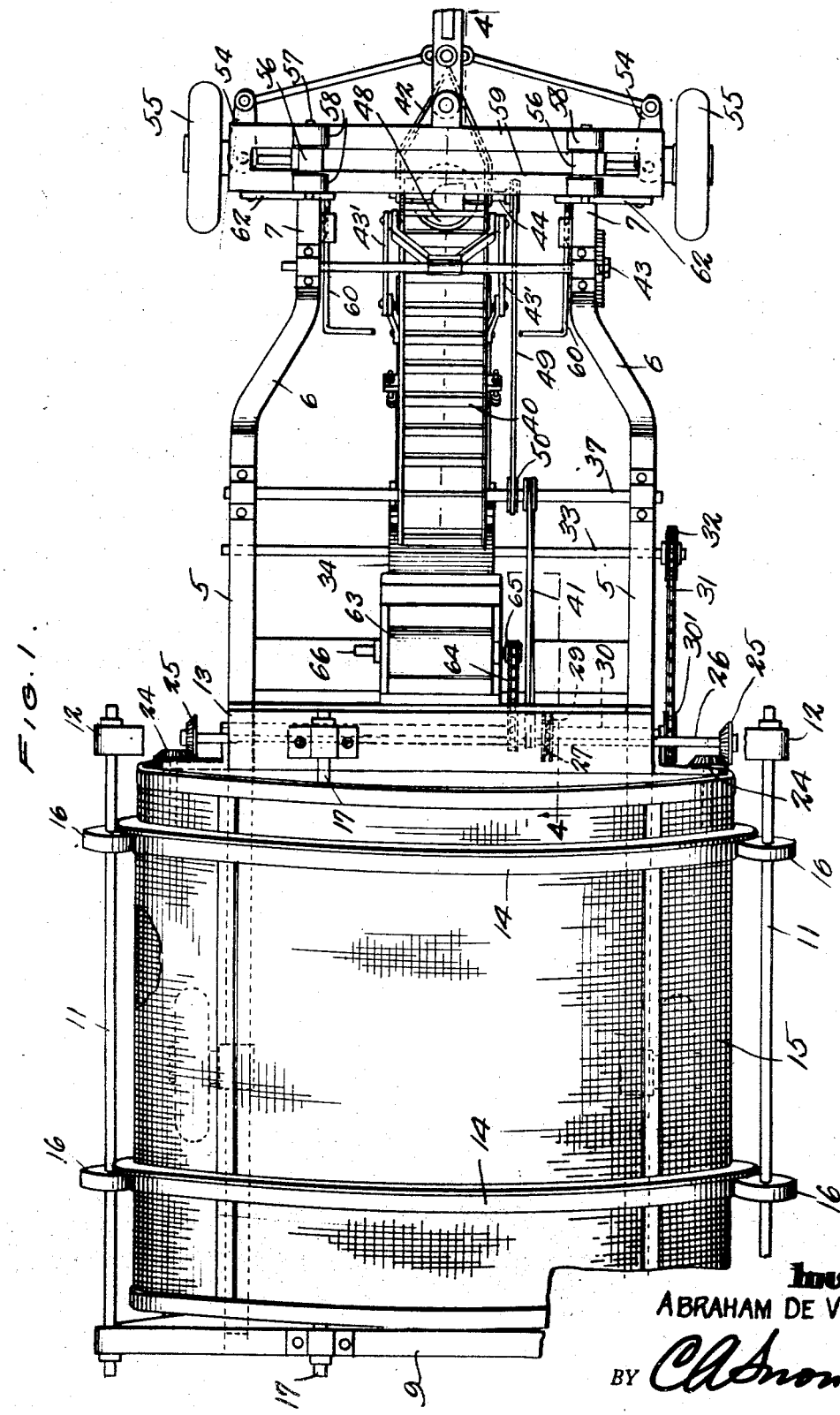
Figure 1 is a plan view of an agricultural machine constructed in accordance with the invention.
Figure 2:
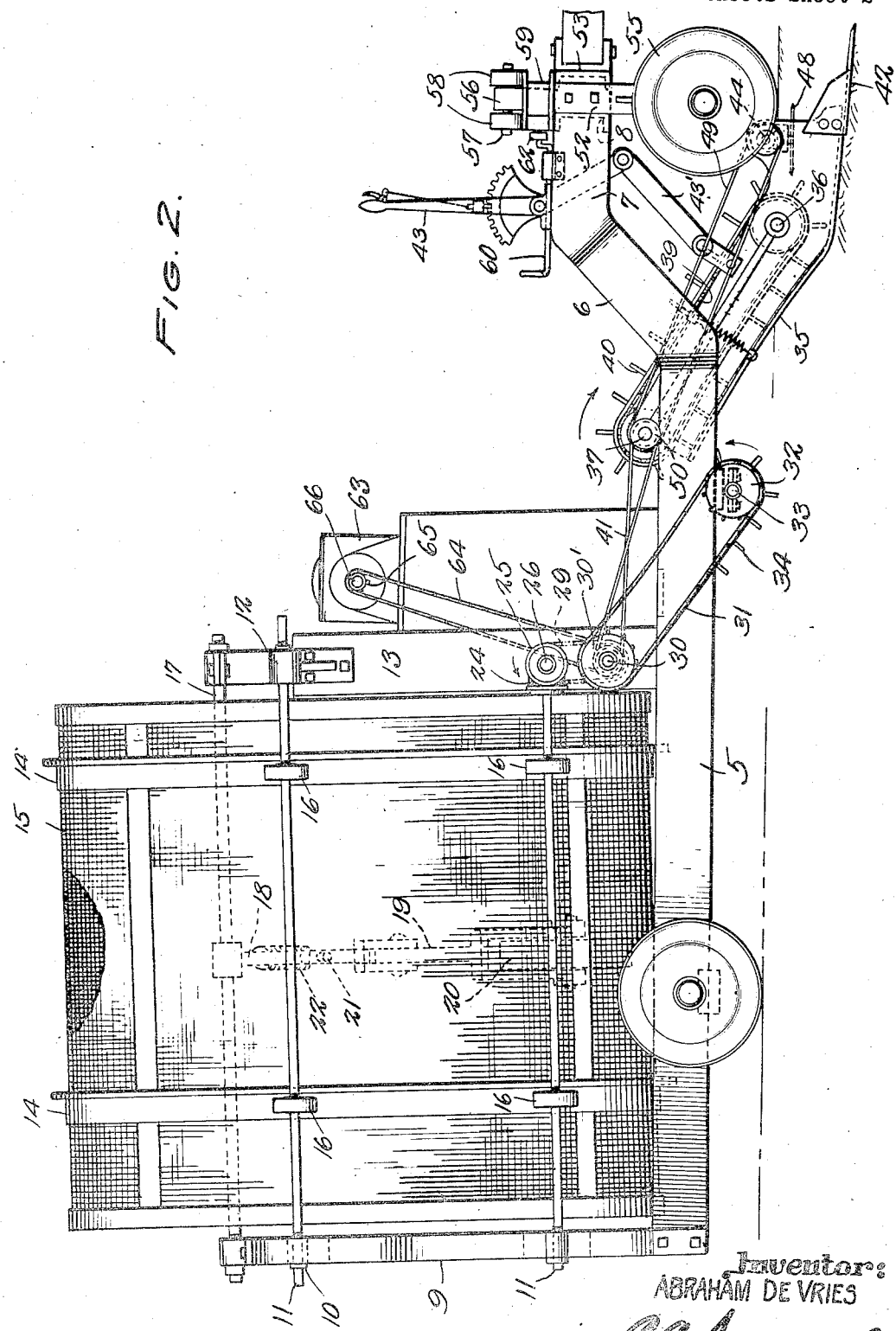
Figure 2 is a side elevational view thereof.

Referring to the drawings in detail, the machine comprises a frame including side rails 5 which have their rear ends connected by a transversely disposed bar, the front ends of the side rails extending upwardly as at 6, and forwardly as at 7, where they are connected by means of the bar 8.

As the rear end of the frame of the machine, is an upstanding frame 9 that is provided with bearings 10 in which the rear ends of the shafts 11 are mounted, the forward ends of the shafts 11 being mounted in bearings 12 that are supported by a forward frame indicated generally by the reference character 13.

Mounted between the side rails 5 of the frame of the machine, are spaced annular track members 14 that are mounted on the periphery of the cylinder or separating drum 15, at the ends of the drum, the drum being constructed of suitable wire mesh material, so that dirt and other foreign matter to be removed from the bulbs, may pass therethrough.

Figure 3:
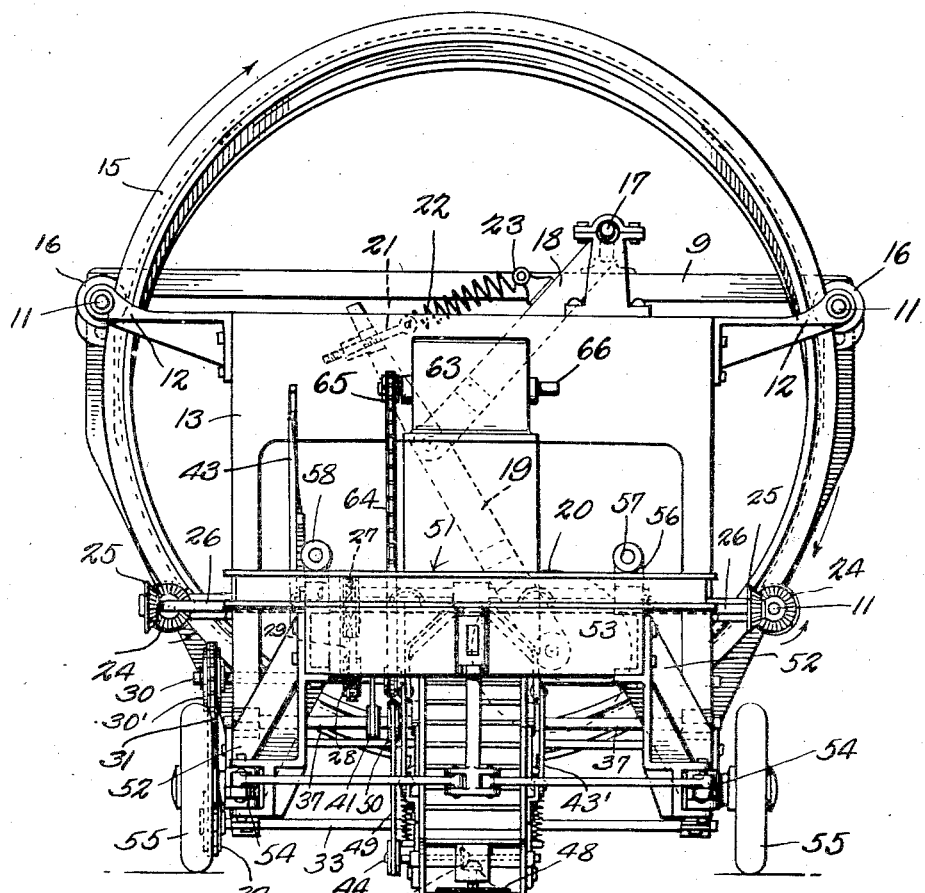
Figure 3 is a front end elevational view of the machine.
Figure 6:
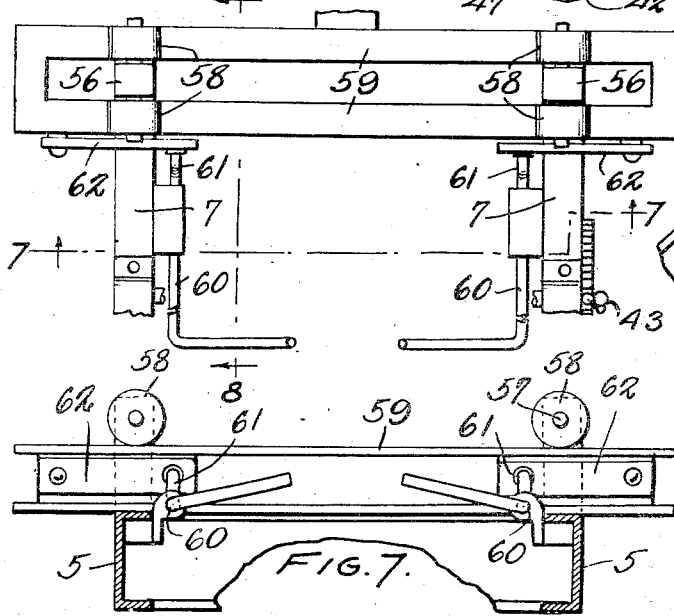
Figure 6 is a fragmental plan illustrating the adjustable support for the forward end of the machine.
Figure 8:
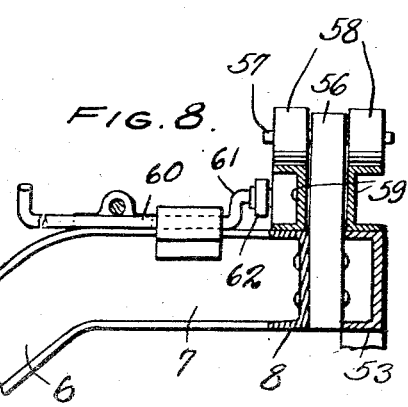
Figure 8 is a sectional view taken on line 8—8 of Figure 6.

Wheels 16 are mounted on the shafts 11 at points directly opposite to the spaced annular track members 14, and frictionally engage the track members 14 to rotate the cylinder or separating drum 15, when power is applied to the shafts 11. These wheels also hold the cylinder to the frame. Connecting the frames 9 and 13, is a shaft 17 mounted in bearings on the upper ends of the frames, the shaft 17 extending through the cylinder or separating drum 15, as clearly shown by the drawings. Connected with the shaft 17, is an arm 18 which extends downwardly and has pivotal connection with the arm 19 that in turn provides a support for the wheel 20 constructed of rubber that moves over the inner surface of the cylinder or separating drum 15. As clearly shown by Figure 3 of the drawings, the upper end of the arm 19 extends an appreciable distance beyond the arm 18, where it is formed with an opening to receive the bolt 21 to which one end of the spring 22 is connected, the opposite end of the spring being anchored to the arm 18, at 23. Thus it will be seen that due to this construction, the wheel 20 acts to crush dirt which may be carried into the cylinder, on the bulbs, thereby relieving the bulbs of all foreign matter.

It will of course be understood that the shafts 11 are disposed on opposite sides of the cylinder or separating drum 15, the lowermost shafts 11 being provided with pinions 24 mounted on the forward ends thereof, which pinions mesh with the pinions 25 secured to the shaft 26 that extends across the forward end of the cylinder or separating drum 15. A sprocket 27 is secured to the shaft 26, and receives motion from the shaft 30, through the sprockets 28 and chain 29 which operates over the sprockets 27 and 28. The sprocket 28 is secured to the shaft 30 that is disposed in parallel relation with the shaft 26 and to which the sprocket 27 is secured. Sprocket 30' is secured to the shaft 30 and accommodates the chain 31 which also operates over the sprocket 32 secured to one end of the horizontal shaft 33 whereby rotary movement is transmitted from the shaft 30, to the shaft 33. The shafts 30 and 33 support the endless carrier 34 and operate to move the endless carrier to carry material upwardly and deposit the material into the open front end of the cylinder or separating drum 15.

Figure 4:
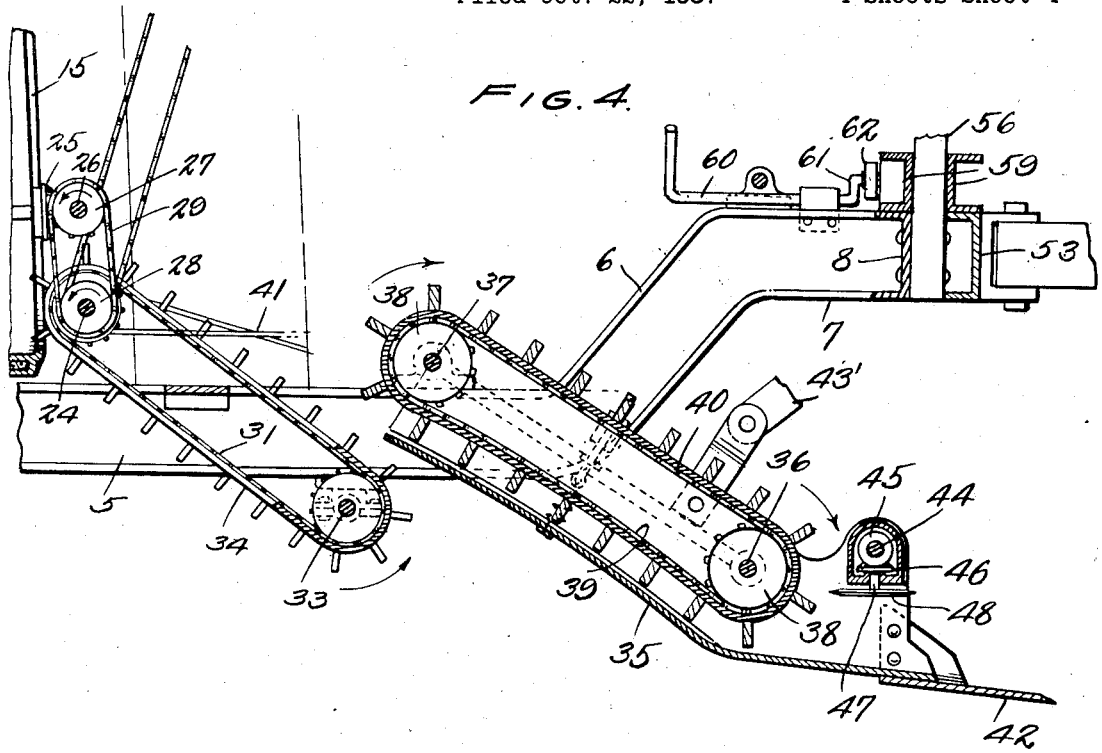
Figure 4 is a sectional view taken on line 4—4 of Figure 1.
Figure 5:
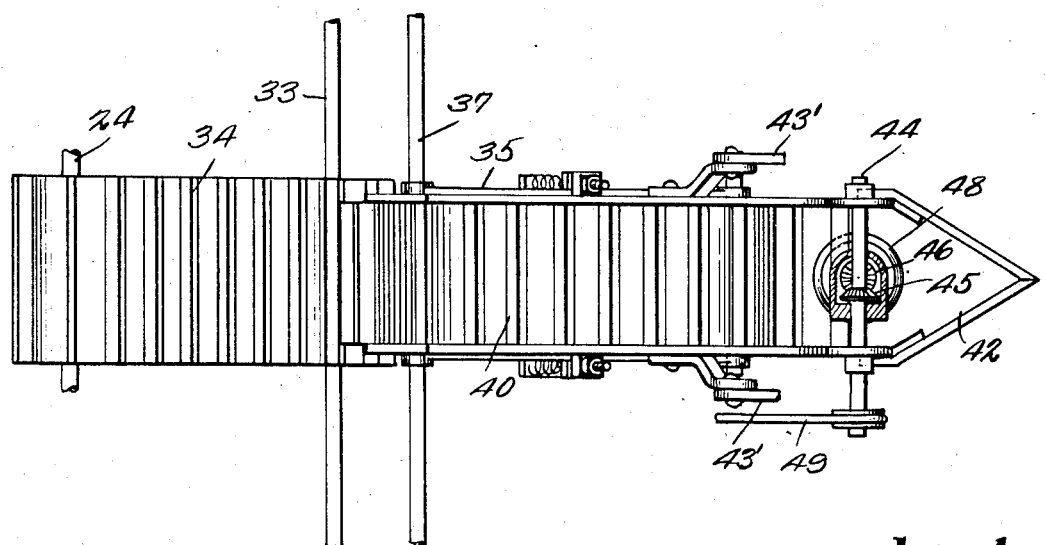
Figure 5 is a plan view of the endless carrier or elevator on which the bulbs are conveyed to the rear end of the machine.

Pivotally mounted adjacent to the forward end of the frame of the machine, is a casing 35 which provides a support for the shaft 36, at the forward end of the casing, and the shaft 37, arranged at the rear end of the casing, the shafts 36 and 37 providing supports for the sprockets 38 mounted on the shafts. These sprockets 38 accommodate the chains 39 provided along the side edges of the endless carrier 40, so that rotary movement of the shaft 37 may be imparted to the shaft 36, as the endless carrier rotates. A belt indicated by the reference character 41 moves between the shafts 30 and 37, transmitting movement of the shaft 30 to the shaft 37 to operate the endless conveyor 40. As clearly shown by Figure 4 of the drawings, the forward end of the casing 35 is supplied with a plow blade 42 that moves under the bulbs being harvested, extracting the bulbs from the ground surface. A control lever indicated by the reference character 43 connects with the link 43' that in turn connects with the carrier frame of the endless carrier 40, and is so arranged that by moving the lever 43, the plow 42 may be adjusted vertically so that the plow may operate at various depths.

Extending transversely of the casing 35, at the forward end thereof, is a shaft 44 that carries a beveled pinion 45 meshing with the pinion 46 mounted on the upper end of the shaft 47, the shaft 47 carrying a rotary cutting blade 48 at the lower end thereof, the cutting blade 48 operating at a point where it will readily cut the tops from the bulbs, and remove soil with the tops, to the end that the quantity of soil passing through the machine is reduced to a minimum. It will be seen that the endless carrier 40 has its rear end disposed at a point above the forward end of the endless carrier 34, so that the material carried upwardly by the carrier 40, will be deposited on the endless carrier 34 to be carried into the cylinder or separating drum 15.

Rotary movement is imparted to the shaft 44, by means of the belt 49 that operates over the pulley 50, secured to the shaft 37. The forward end of the machine is supported by the truck indicated generally by the reference character 51, the truck embodying brackets 52 connected by means of the bar 53, the brackets providing support for the stub shafts or steering knuckles 54 on which the wheels 55 are mounted. Rising from the bar 8 of the frame 5 are arms 56 that support the shafts 57 on which the rollers 58 are mounted, the rollers 58 resting on the bars 59 that are of channel bar construction, and supported by the bar 53 of the truck frame 51, the open sides of the bars 59 being disposed outwardly, the inner sides being spaced apart providing a clearance for the arms 56. This construction provides means whereby the frame 5 of the machine may be adjusted laterally to align the plow 42 with a row of bulbs being harvested.

Mounted on the forwardly extended ends of the side rails 5, are rods 60 that have offset end portions 61 connected with the links 62 which connect with the innermost bar 59. Thus it will be seen that as these rods 60 are rocked, the frame of the machine may be swung laterally to accomplish the adjusting feature as previously described.

A suitable motor indicated by the reference character 63 is mounted on the body of the machine, and power is transmitted to the shaft 30, through the chain 64 that moves over the sprocket 65 mounted on one end of the motor shaft 66.

From the foregoing it will be seen that due to the construction shown and described, the machine, will, when moved along a row of bulbs to be harvested, dig the bulbs from the ground surface, and the endless conveyors will carry the bulbs rearwardly depositing them in the cylinder or separating drum 15, where the foreign matter will be removed by agitation, caused when the cylinder or separating drum 15 revolves.

It will of course be understood that when the bulbs pass into the machine, the tops and a quantity of the soil will have been removed.

I claim:

1. A bulb harvesting machine comprising a frame, a rotary screening drum mounted on the frame, a spring-pressed pivoted arm mounted within the screening drum, a wheel on the free end of the arm and adapted to move over the inner surface of the screening drum holding the screening drum on the frame, and means for delivering material to the screening drum.

2. A bulb harvesting machine comprising a frame, shafts extending longitudinally of the frame, wheels on the shafts, a rotary screening drum mounted on the frame and resting on said wheels, a shaft extending through the drum, pivoted arms mounted on the second mentioned shaft, a spring for exerting pressure on said arms, a wheel on one of said arms and said wheel adapted to exert a pressure against the drum holding the drum in position on the wheels.

3. A bulb harvesting machine comprising a frame, a rotary separating drum on the frame, a truck on which the forward end of the frame is mounted, rods mounted at the forward end of the frame, said rods having offset end members, links connected with the truck and offset ends of the rods, and said rods adapted to move the forward end of the frame laterally with respect to the truck when said rods are rotated, and endless conveyors supported on the frame and adapted to deliver material to the rotary separating drum.

ABRAHAM DE VRIES.